(12) United States Patent
Maes et al.

(10) Patent No.: US 11,716,172 B2
(45) Date of Patent: Aug. 1, 2023

(54) METHOD, RECEIVER AND NETWORK APPARATUS FOR DELIVERING PAYLOADS THROUGH AN INTERFACE

(71) Applicant: Nokia Technologies OY, Espoo (FI)

(72) Inventors: Jochen Maes, Antwerp (BE); Miek Dekeyser, Antwerp (BE)

(73) Assignee: Nokia Technologies Oy, Espoo (FI)

( * ) Notice: Subject to any disclaimer, the term of this patent is extended or adjusted under 35 U.S.C. 154(b) by 94 days.

(21) Appl. No.: 16/757,611

(22) PCT Filed: Nov. 15, 2018

(86) PCT No.: PCT/EP2018/081331
§ 371 (c)(1),
(2) Date: Apr. 20, 2020

(87) PCT Pub. No.: WO2019/096886
PCT Pub. Date: May 23, 2019

(65) Prior Publication Data
US 2020/0328847 A1 Oct. 15, 2020

(30) Foreign Application Priority Data
Nov. 20, 2017 (EP) .................................. 17202606

(51) Int. Cl.
*H04L 1/1809* (2023.01)
*H04L 1/1607* (2023.01)
(Continued)

(52) U.S. Cl.
CPC .......... *H04L 1/1809* (2013.01); *H04L 1/1642* (2013.01); *H04L 1/1835* (2013.01);
(Continued)

(58) Field of Classification Search
CPC ..... H04L 69/22; H04L 1/1809; H04L 69/321; H04L 49/9057; H04L 1/1642; H04L 1/1835; H04L 1/201; H04L 1/1854
(Continued)

(56) References Cited

U.S. PATENT DOCUMENTS 7,260,102 B2   8/2007   Mehrvar et al.
8,413,000 B2   4/2013   Sorbara et al.
(Continued)

OTHER PUBLICATIONS

C. C. Monteiro et al., 'Video Session Handoff between WLANs' *IEEE Conference Paper*, Mar. 2010.
(Continued)

*Primary Examiner* — Rownak Islam
(74) *Attorney, Agent, or Firm* — Harness, Dickey & Pierce, P.L.C.

(57) ABSTRACT

A method for delivering payloads through an interface includes receiving an out-of-sequence data transfer unit, DTU; segmenting the out-of-sequence DTU into at least one data unit; determining at least one priority level of the at least one data unit; and for any particular data unit among the at least one data unit, (1) selectively forwarding a payload of the particular data unit to the interface in response to priority level thereof satisfying a priority condition; or (2) holding the particular data unit in response to the priority level thereof not satisfying the priority condition.

15 Claims, 3 Drawing Sheets

(51) Int. Cl.
*H04L 1/1829* (2023.01)
*H04L 1/20* (2006.01)
*H04L 49/9057* (2022.01)
*H04L 69/22* (2022.01)
*H04L 69/321* (2022.01)

(52) U.S. Cl.
CPC ............ *H04L 1/1854* (2013.01); *H04L 1/201* (2013.01); *H04L 49/9057* (2013.01); *H04L 69/22* (2013.01); *H04L 69/321* (2013.01)

(58) Field of Classification Search
USPC ........................................................ 370/474
See application file for complete search history.

(56) References Cited

U.S. PATENT DOCUMENTS

| | | | | |
|---|---|---|---|---|
| 8,555,149 | B2* | 10/2013 | Pons | ................ H04L 1/1835 |
| | | | | 714/748 |
| 8,787,325 | B2 | 7/2014 | Van Parys | |
| 9,048,995 | B2 | 6/2015 | Xia et al. | |
| 9,294,410 | B2 | 3/2016 | Boden | |
| 2007/0081513 | A1* | 4/2007 | Torsner | ................ H04L 1/1874 |
| | | | | 370/349 |
| 2007/0159985 | A1* | 7/2007 | Sunell | ................ H04L 69/16 |
| | | | | 370/254 |
| 2008/0228936 | A1 | 9/2008 | Schmid et al. | |
| 2009/0313517 | A1* | 12/2009 | Schedelbeck | ......... H04L 1/1874 |
| | | | | 714/E11.131 |
| 2010/0138714 | A1* | 6/2010 | Sorbara | ................ H04L 1/1874 |
| | | | | 714/748 |
| 2010/0226373 | A1* | 9/2010 | Rowell | ................ H04L 43/026 |
| | | | | 370/395.31 |
| 2012/0170445 | A1 | 7/2012 | Perumanam et al. | |
| 2014/0331303 | A1* | 11/2014 | Park | .................... H04W 12/062 |
| | | | | 726/10 |
| 2017/0070547 | A1 | 3/2017 | Falk et al. | |

OTHER PUBLICATIONS

'Improved impulse noise protection for digital subscriber line (DSL) transceivers' *ITU-T: Telecommunication Standardization Sector of ITU*, Recommendation G.998.4, Nov. 2018.

European Office Action dated Nov. 17, 2021 issued in corresponding European Appln. No. 17202606.4.

International Search Report PCT/ISA/210 for International Application No. PCT/EP2018/081331 dated Feb. 15, 2019.

* cited by examiner

METHOD, RECEIVER AND NETWORK APPARATUS FOR DELIVERING PAYLOADS THROUGH AN INTERFACE

CROSS-REFERENCE TO RELATED APPLICATIONS

This application is a national phase under 35 U.S.C. § 371 of PCT International Application No. PCT/EP2018/081331, which has an International filing date of Nov. 15, 2018, which claims priority to European Application No. 17202606.4, filed Nov. 20, 2017, the entire contents of each of which are hereby incorporated by reference.

FIELD OF INVENTION

The field of the invention relates to data communication. Particular embodiments relate to a method, a receiver and a network apparatus for delivering payloads through an interface.

BACKGROUND

Current xDSL (e.g. G.fast, VDSL2) technologies using twisted pairs or coax suffer of latency due to relying on a retransmission scheme for error performance. This in turn leads to jitter, since such retransmission may be spread inconstantly over time. Recently, services have increasingly demanding latency requirements. For example, in the design of 5G mobile networks, the assumed service requirements for low-latency services are <1 ms round trip time. Those same services may also use a fixed network. For the end user, it shouldn't matter if the service uses a mobile subscription or a fixed subscription. If 5G can meet the service requirements, a fixed network should also be able to meet the same service requirements.

However, as stated above, these xDSL technologies rely on a retransmission scheme to obtain an error performance that is adequate for broadband access. An inherent drawback of retransmissions is an additional latency (hence, jitter) whenever a data transfer unit (DTU) needs to be retransmitted. In order to serve low-latency traffic, the retransmission scheme can be disabled, but this is disadvantageous for the error performance of other types of traffic than such low-latency traffic. Alternatively, if the retransmission scheme is kept enabled, this may be advantageous for those other types of traffic, but disadvantageous for the latency performance of low-latency traffic.

Dual latency schemes (with two different latency paths) have been defined for older xDSL technologies. However, the disadvantages of these dual latency schemes include the following. First, allocation of resources (such as pipe size) to each different latency path is fixed, meaning that throughput is also limited, such that, if the amount of low-latency traffic is relatively low compared to other types of traffic, then the allocated resources cannot be re-used for the other types of traffic (and vice versa). Second, because these schemes define two complete paths on one single physical layer (PHY) link, they require each port to have more than one interface (viz. G.int) with an interworking function, which increases complexity of the structure and operation of the components.

SUMMARY

The object of embodiments of the present invention is to improve traffic handling in case of mixed low-latency and regular traffic.

According to a first aspect of the present invention there is provided a method for delivering payloads through an interface. The method comprises: receiving an out-of-sequence data transfer unit, DTU; segmenting the out-of-sequence DTU into at least one data unit; determining at least one priority level of the at least one data unit; and, for any particular data unit among the at least one data unit, selectively forwarding a payload of the particular data unit to the interface if its priority level satisfies a priority condition or holding the particular data unit if its priority level does not satisfy the priority condition.

Note that in this context a "data transfer unit" or "DTU" may be considered as the basic unit of transmission and retransmission that is, a DTU is transmitted as a single data package, and if a DTU does not arrive at its destination correctly or does not arrive there at all, retransmission may be requested of that DTU. It is noted that the abbreviation "DTU" is sometimes expanded to "data transmit unit" or "data transmission unit" instead of "data transfer unit", but this is of no consequence to the present disclosure. Also note that in this context the term "out-of-sequence" may in particular mean that a sequence identifier of an out-of-sequence DTU does not consecutively follow a highest sequence identifier of DTUs that were received prior to the out-of-sequence DTU. Sequence identifiers in the context of DTU may preferably be numbers that can readily be incremented, most preferably consecutive natural numbers. In practice, sequence identifiers may preferably be represented using the notation $00_{16}$, $01_{16}$, ..., $FF_{16}$, after which the consecution preferably returns back to $00_{16}$. It is to be noted that "selectively forwarding or holding" means that one operation from the operations of forwarding and holding is selected, and that the selected operation is performed. It is further to be noted that in this context "any" refers to selecting one or some of whatever kind indiscriminately.

Embodiments of the present invention are based inter alia on the insight that traffic with priority (e.g. low-latency traffic) may advantageously not have to wait for retransmission of any missing DTUs before being forwarded to the interface, but that other traffic may nevertheless benefit from the better error performance due to the retransmission scheme. In this context, "traffic" may be taken to mean any number of payloads.

In a particular embodiment, the interface may be the so-called gamma (γ) interface for xDSL appliances.

In an embodiment, the method may comprise: after receiving the out-of-sequence DTU, receiving at least one retransmitted DTU; segmenting the at least one retransmitted DTU into at least one further data unit; determining at least one priority level of the at least one further data unit; and discarding any one or more data units among the at least one further data unit whose priority level satisfies the priority condition. Note that in this context "retransmission" may refer e.g. to physical layer (PHY) retransmission, for example for enhancing impulse noise protection (INP)—preferably as defined in ITU-T (International Telecommunication Union: Telecommunication Standardization Sector) recommendation G.998.4: "Improved impulse noise protection for digital subscriber line (DSL) transceivers". In this manner, priority payloads such as low-latency payloads may be thrown away, because due to their priority (in particular their low-latency), they may have timed out already, and because subsequent (i.e. from a later point in time) priority payloads may already have been forwarded to the interface and thus delivered to higher layers of the communication stack. In other words, when a missing DTU with a sequence identifier prior to the particular sequence identifier of the received DTU was retransmitted and is subsequently received, any priority payload (i.e. a payload having absolute or relative priority), in particular low-latency payload, encoded in the missing DTU may preferably be discarded. In a specific alternative embodiment, if no subsequent priority payloads have already been forwarded, it may instead be foreseen to forward the particular data unit, because, even though that particular data unit may potentially be too late, the relative order of the priority payloads will nevertheless remain guaranteed.

In another embodiment, the priority condition may relate to a latency requirement of the particular data unit, and may optionally further relate to a requirement on a number of retransmissions of the particular data unit. In this manner, low-latency traffic that is subject to latency requirements dictated by the service to which the low-latency traffic belongs may be selectively forwarded or held depending on the remaining time available for it. In the optional case, particular types of traffic may for example be allowed to be retransmitted several times (e.g. one, two, or more times) for better error performance as a trade-off of latency performance, either a predetermined number of times or a number of times depending on system conditions, or depending on time lapsed. In a particular embodiment, the receiver may be made aware of the number of transmission attempts (or equivalently and without loss of generality, retransmission attempts) relating to a particular DTU (or equivalently and without loss of generality, data units of the particular DTU), for example via an indication in each DTU, or via a separate channel, or via a heuristic estimation (e.g. based on the time that has lapsed since a previous point in time, such as the last time of receiving a DTU).

In case the priority condition allows for a finite non-zero number of retransmissions, then a data unit may be held even though its payload is time critical. In that case, the receiver may advantageously forward the previously held low-latency traffic when a maximum allowed latency is reached, or when the retransmission of a preceding data unit remains unsuccessful after a maximum number of allowed retransmission attempts. In this way, correctly received low-latency traffic is forwarded within its available time, even if retransmission of one or more preceding data units remains unsuccessful. Hence, in case of a finite non-zero number of allowed retransmissions, the receiver may use time lapsed or a retransmit counter to trigger the forwarding of held low-latency traffic.

In a particular embodiment, the priority condition may be preconfigured by an operator or may alternatively be dynamically adjusted by a control unit. A configuration message may detail how priority levels may be mapped to one or more priority conditions. The configuration message may in a preferred embodiment be sent from an operator's control network to the receiver. In case the receiver is comprised within customer premises equipment, the configuration message may be sent to a transmitter in an access node, who may subsequently encapsulate the configuration message into an operation or management channel, for instance an embedded overhead channel. The control unit may further translate a latency requirement into a requirement on a number of retransmissions, or vice versa. The receiver may advantageously use the priority condition, the priority level and the time lapsed to determine whether to forward, hold or discard low-latency traffic.

In a preferred embodiment, the method may comprise: determining at least one payload integrity of the at least one data unit; and, if the particular data unit whose priority level satisfies the priority condition has an incomplete payload (i.e. there is a preceding complement of the payload e.g. a preceding part of a single layer 2 frame that was packaged as payloads in two or more distinct data units that is missing), discarding that particular data unit. In this manner, efficiency can be improved, because incomplete priority payloads such as low-latency payloads that would have to await the retransmission of their preceding complementary portion(s) and would thus run the risk of exceeding their available time, can instead be discarded aggressively, thus freeing up resources.

In another possible embodiment, the method may comprise, prior to the forwarding, reassembling payloads of the at least one data unit into layer 2 frames. Note that "layer 2" may in this context refer to the data link layer in the OSI (Open Systems Interconnection) model, and preferably to one or more of the well-known data link protocols Ethernet, PPP, HDLC and ADCCP. In this manner, complete layer 2 frames may be provided to a higher layer of the communication stack.

In a further developed embodiment, determining a priority level of a data unit may comprise retrieving an indication of the priority level from overhead data of the data unit; or it may comprise inspecting a header of a payload of the data unit to determine an indication of the priority level. Furthermore, determining a priority level of a data unit may optionally further comprise determining a number of transmissions attempts of the data unit or determining time lapsed since the original failed transmission. In this manner, in the case that an indication of the priority level is retrieved from overhead data of a data unit, there is the benefit that, in case of an end-portion of e.g. a layer 2 frame being included in that data unit (so without the layer 2 frame's header), it is known immediately after the retrieval from the overhead data that this particular data unit may be discarded, since awaiting retransmission and reassembly of its beginning-portion may be pointless in view of the priority and latency.

In yet another embodiment, the method may comprise storing the received DTU in a receiver retransmission queue; and holding the particular data unit may preferably comprise storing the particular data units in the receiver retransmission queue. In this manner, already available hardware (due to the presence of a retransmission request scheme) may be used efficiently.

In a particular embodiment, the method may comprise storing the received out-of-sequence DTU—preferably in the receiver retransmission queue and after receiving any one or more retransmitted DTUs, segmenting the one or more retransmitted DTUs as well as the stored out-of-sequence DTU into at least two data units, and, for any particular data unit among the at least two data units, selectively discarding the particular data unit if its priority level satisfies a priority condition or forwarding a payload of the particular data unit to the interface if its priority level does not satisfy the priority condition. In this manner, data units that have already been forwarded or that are too late for being forwarded can be left out, improving efficiency.

According to another aspect of the present invention, there is provided a receiver. The receiver may be suitable for delivering payloads through an interface. The receiver comprises a processor and a memory, and the processor is configured for: receiving an out-of-sequence data transfer unit, DTU; segmenting the out-of-sequence DTU into at least one data unit; determining at least one priority level of the at least one data unit; and for any particular data unit among the at least one data unit, selectively forwarding a payload of the particular data unit to the interface if its priority level satisfies a priority condition or holding the particular data unit if its priority level does not satisfy the priority condition.

It will be understood by the skilled person that the features, considerations, and advantages disclosed hereinabove with respect to various embodiments of the method may also apply, mutatis mutandis, to various embodiments of the receiver.

In a particular embodiment, the processor may be configured for requesting retransmission of any missing DTUs with a sequence identifier prior to a sequence identifier of the out-of-sequence DTU. The requesting may be explicit, by sending a list indicating sequence identifiers of missing DTUs, or may be implicit, by positively acknowledging reception of error-free DTUs. In the latter, it may be expected that a cooperating transmitter will infer which DTU(s) is or are missing.

In a preferred embodiment, the processor may be configured for: after receiving the out-of-sequence DTU, receiving at least one retransmitted DTU; segmenting the at least one retransmitted DTU into at least one further data unit; determining at least one priority level of the at least one further data unit; and for discarding any one or more data units among the at least one further data unit whose priority level satisfies the priority condition.

In another embodiment, the priority condition may relate to a latency requirement of the particular data unit, and may optionally further relate to a requirement on a number of retransmissions of the particular data unit.

In a preferred embodiment, the processor may be further configured for: determining at least one payload integrity of the decoded at least one data unit; and if the particular data unit whose priority level satisfies the priority condition has an incomplete payload, discarding the particular data unit.

In another possible embodiment, the processor may be further configured for: reassembling payloads of the at least one data unit into layer 2 frames.

In a further developed embodiment, the processor may be configured for determining a priority level of a data unit by: retrieving an indication of the priority level from overhead data of the data unit; or inspecting a header of a payload of the data unit to determine an indication of the priority level. Furthermore, the processor may optionally be further configured for determining a priority level of a data unit by determining a number of transmissions attempts of the data unit. Such a priority indication may for example have been encoded in the overhead data of the data unit by a DTU framer (configured for generating and combining data units) at the transmitter.

In yet another embodiment, the processor may be configured for storing the received DTU in a receiver retransmission queue; and preferably storing the particular data unit in the receiver retransmission queue.

In a particular embodiment, the processor may be configured for storing the received out-of-sequence DTU— preferably in the receiver retransmission queue—and after receiving any one or more retransmitted DTUs, segmenting the one or more retransmitted DTUs as well as the stored out-of-sequence DTU into at least two data units, and, for any particular data unit among the at least two data units, selectively discarding the particular data unit if its priority level satisfies a priority condition or forwarding a payload of the particular data unit to the interface if its priority level does not satisfy the priority condition.

According to another aspect of the present invention, there is provided a network apparatus comprising a receiver according to any one of the above-described embodiments.

A particularly preferred embodiment of the network apparatus according to the present invention may thus be used for performing a method according to any one of the above-described embodiments.

It will be understood by the skilled person that the features, considerations, and advantages disclosed hereinabove with respect to various embodiments of the method and various embodiments of the receiver may also apply, mutatis mutandis, to various embodiments of the network apparatus.

According to another aspect of the present invention, there is provided a communication system comprising a network apparatus as described above.

Further aspects of the present invention are described by the dependent claims. The features from the dependent claims, features of any of the independent claims and any features of other dependent claims may be combined as considered appropriate to the person of ordinary skill in the art, and not only in the particular combinations as defined by the claims.

BRIEF DESCRIPTION OF THE FIGURES

The accompanying drawings are used to illustrate presently preferred non-limiting exemplary embodiments of devices of the present invention. The above and other advantages of the features and objects of the present invention will become more apparent and the present invention will be better understood from the following detailed description when read in conjunction with the accompanying drawings, in which.

DESCRIPTION OF EMBODIMENTS

Embodiments of the present invention as described above may be advantageously applied in a context of xDSL appliances i.e. various Digital Subscriber Line technologies. Embodiments of the present invention may be especially advantageously applied when there is a mix of different types of traffic including low-latency traffic in the physical layer.

In known receivers, whenever an erroneous DTU is received (that is, a corrupted DTU or a DTU with an unexpected sequence identifier), all subsequent correctly received DTUs may be stored (i.e. put) in a receiver retransmission queue until the retransmit is successful (or until timeout).

A receiver according to the present invention may comprise a processor and a memory, wherein the processor may be configured for receiving an out-of-sequence data transfer unit, DTU; for segmenting the out-of-sequence DTU into at least one data unit; for determining at least one priority level of the at least one data unit; and for, for any particular data unit among the at least one data unit, selectively forwarding a payload of the particular data unit (and optionally further elements thereof) to the interface if its priority level satisfies a priority condition or holding the particular data unit if its priority level does not satisfy the priority condition.

In other words, each correctly received DTU may be segmented, even if missing preceding DTUs are still awaiting to be retransmitted. The processor may then identify priority payloads, in particular low-latency payloads, and may forward those through the interface. In the case of a gamma interface, this would typically be connected to a L2+ (layer 2 or higher) packet processor.

In this way, low-latency payloads don't necessarily have to wait for a retransmit of a preceding erroneous DTU. It is to be noted that this may imply that low-latency payloads may bypass normal payloads, i.e. the order in which payloads are received from the higher layers by a cooperating transmitter may be different from the order in which (reassembled) payloads are eventually delivered by the receiver to the higher layers. This is normally not acceptable for a non-QoS (quality of service) aware process. However, the order within each individual QoS stream remains the same—low-latency payloads may "sneak in" before other payloads, but it is an insight of the inventor that this is acceptable and even desirable.

Once a retransmission is successful, the processor may segment any one or more DTUs that were previously received and that were for example stored in a receiver retransmission queue. Low-latency payloads in the retransmitted DTU may preferably even be discarded, for two reasons: because they are low-latency, they may have timed out already anyway, and (2) because subsequent low-latency payloads in DTUs in the receiver retransmission queue may already have been delivered to the higher layers. If condition (2) is not the case, the receiver may decide to deliver the low-latency payload anyhow, because the order of low-latency payloads is preserved.

It is understood that in embodiments according to the present invention, the error performance of the priority traffic (e.g. low-latency payloads) may be worse due to the absence of retransmissions. However, it is an insight of the inventor that this may be acceptable because low-latency traffic (composed of low-latency payloads) is often also more error tolerant. Alternatively, one may enforce the coding on low-latency traffic, for example through FEC (forward error correction) or repetition encoding. Because low-latency traffic often has low rate requirements (relative to non-low-latency traffic), the additional overhead due to the enforced error protection is acceptable compared to high link throughput.

Figure 4:
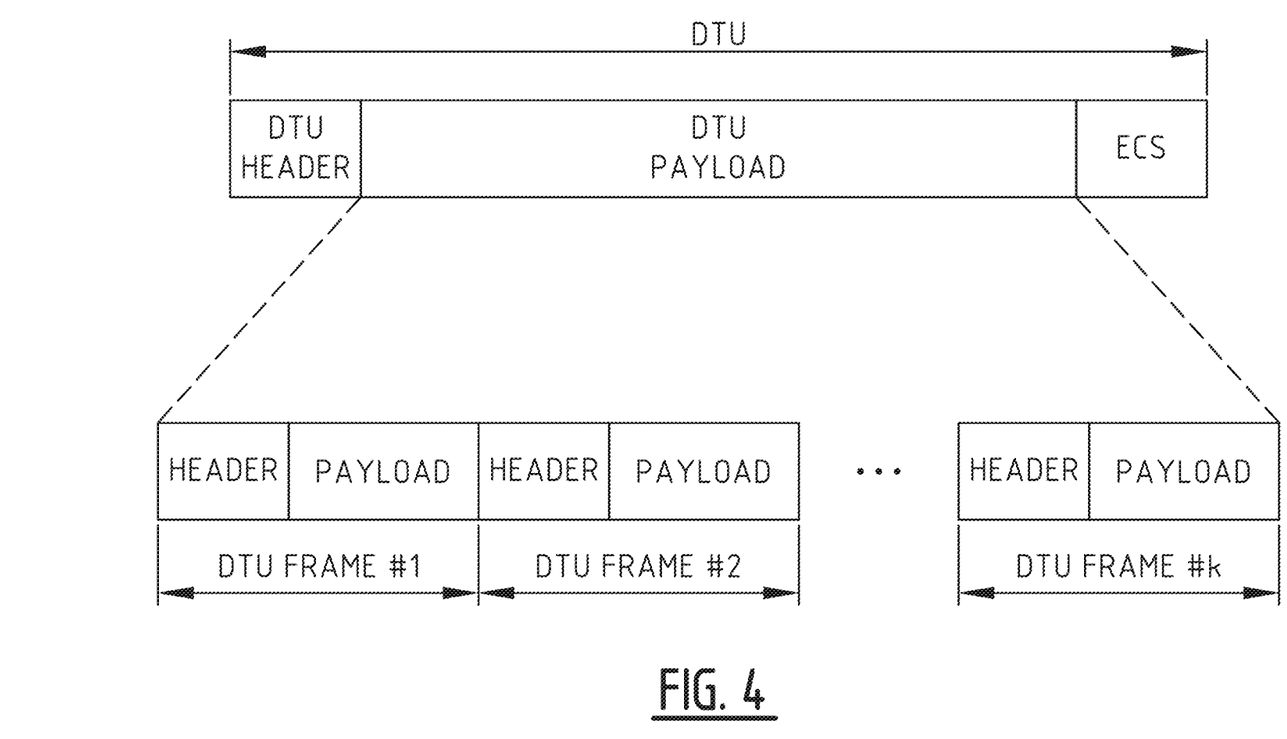
FIG. 4 schematically illustrates the structure of an example DTU that is usable by embodiments according to the present invention.

It will be understood that the method may preferably comprise error-checking the received DTU (for which purpose an error checksum, ECS, or the like may be provided in the DTU, as is shown in FIG. 4); and, if the error-checking indicates an incorrigible error in the received DTU, explicitly or implicitly requesting retransmission of the received DTU. In this case, the sequence identifier of the received DTU may preferably be evaluated after the error-checking indicates that the received DTU is free of incorrigible errors.

It will likewise be understood that the method may preferably comprise error-checking the at least one retransmitted DTU; and, if the error-checking indicates incorrigible errors in the at least one retransmitted DTU, requesting retransmission of the at least one retransmitted DTU.

If any error-checking operation results either in the indication that there are no errors at all in the at least one retransmitted DTU, or in the indication that there were one or more errors in the at least one retransmitted DTU but that these one or more errors were successfully corrected (e.g. using a well-known error-correction scheme such as Reed-Solomon coding), then further operation of the method may continue unfalteringly.

Furthermore, it will be understood that, if an in-sequence DTU is received (i.e. a DTU whose sequence identifier immediately follows a highest sequence identifier of DTUs received previously), then the method may preferably comprise decoding at least one data unit of the received DTU; and forwarding the at least one data unit to the interface.

Figure 1:
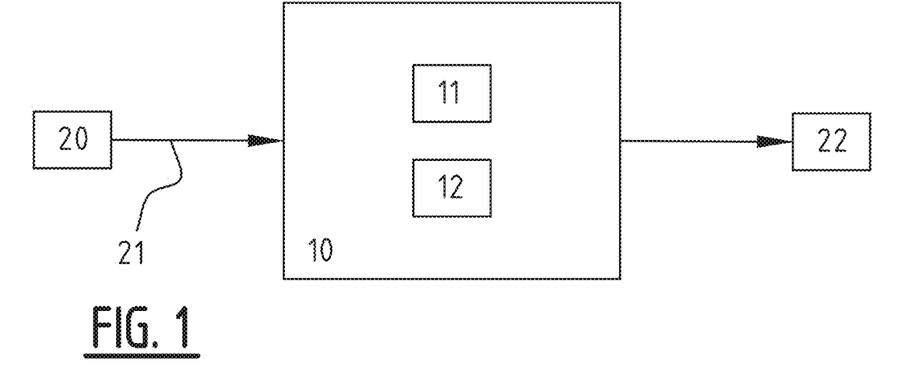
FIG. 1 schematically illustrates an embodiment of a receiver according to the present invention.

FIG. 1 schematically illustrates an embodiment of a receiver 10 according to the present invention. Receiver 10 may be suitable for delivering payloads through interface 22, which may for example be the so-called gamma interface of xDSL appliances. Receiver 10 may comprise processor 11 and memory 12. Processor 11 may be configured for receiving an out-of-sequence DTU. Processor 11 may further be configured for segmenting the out-of-sequence DTU into at least one data unit. Processor 11 may further be configured for determining at least one priority level of the at least one data unit. Processor 11 may further be configured for, for any particular data unit among the at least one data unit, selectively forwarding a payload of the particular data unit to interface 22 if its priority level satisfies a priority condition or holding the particular data unit if its priority level does not satisfy the priority condition.

The figure further shows physical layer 21, which may be implemented as a physical medium such as e.g. a digital subscriber line of twisted pairs of wires. Physical layer 21 couples receiver 10 to transmitter 20, which may transmit data, in the form of payloads encapsulated in data units contained in DTUs, to receiver 10. Receiver 10 may then eventually deliver these payloads through interface 22, as stated above.

In a further developed embodiment, processor 11 may further be configured for requesting retransmission of at least one missing DTU with a sequence identifier prior to a sequence identifier of the out-of-sequence DTU. For this, the processor may preferably further have access to a means for requesting retransmission to transmitter 20, for example in the form of a Retransmission Request Channel (RRC) as defined in the above-referenced ITU-T recommendation G.998.4.

In this further developed embodiment, or in an alternative embodiment wherein retransmission may be requested implicitly as is described elsewhere in this specification, processor 11 may further be configured for, after receiving the out-of-sequence DTU, receiving at least one retransmitted DTU. Processor 11 may further be configured for segmenting the at least one retransmitted DTU into at least one further data unit. Processor 11 may further be configured for determining at least one priority level of the at least one further data unit. Processor 11 may further be configured for discarding any one or more data units among the at least one further data unit whose priority level satisfies the priority condition.

Figure 2:
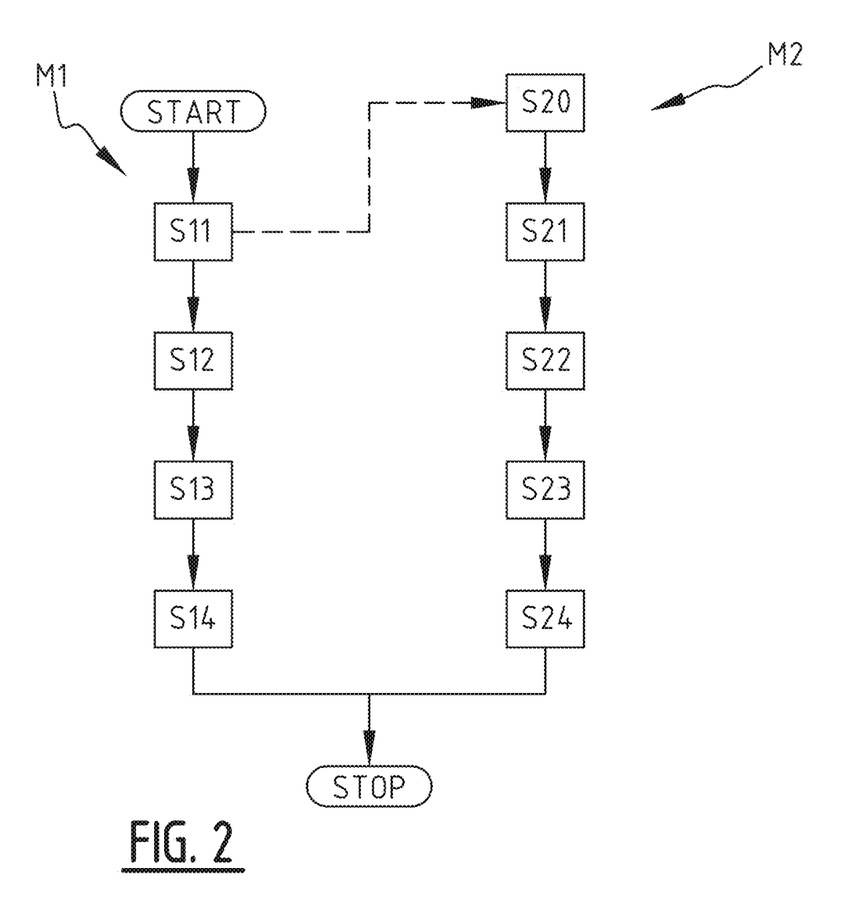
FIG. 2 schematically illustrates a flowchart of two embodiments of a method according to the present invention.

FIG. 2 schematically illustrates a flowchart of two embodiments M1, M2 of a method according to the present invention.

M1 comprises operations S11, S12, S13 and S14. M2 further comprises operations S20 (subsequent to operation S11), S21, S22, S23 and S24.

In operation S11, an out-of-sequence DTU may be received, for example at receiver 10 of FIG. 1.

In operation S12, the out-of-sequence DTU may be segmented into at least one data unit, for example by processor 11 of FIG. 1.

In operation S13, at least one priority level of the at least one data unit may be determined, for example by processor 11 of FIG. 1.

Operation S14 comprises, for any particular data unit among the at least one data unit, selectively forwarding a payload of the particular data unit to the interface if its priority level satisfies a priority condition or holding the particular data unit if its priority level does not satisfy the priority condition, for example by processor 11 of FIG. 1.

In operation S20, retransmission may optionally be requested explicitly, for example by processor 11 of FIG. 1, of at least one missing DTU with a sequence identifier prior to a sequence identifier of the out-of-sequence DTU. Operation S20 may follow execution of operation S11 of method M1, in which an out-of-sequence DTU may have been received meanwhile, method M1 may be executed further with operations S12, S13 and S14, preferably concurrently with operations S20, S21, S22, S23 and S24 of method M2.

Note that retransmission may also be requested implicitly, for example by positively acknowledging successful reception of an out-of-sequence DTU. However, this distinction is of no substantial consequence to the operation of method M2.

In operation S21, after receiving the out-of-sequence DTU in operation S11, for example in response to the requesting of operation S20, a or the retransmitted at least one DTU may be received, for example by processor 11 of FIG. 1.

In operation S22, the at least one retransmitted DTU may be segmented into at least one data unit, for example by processor 11 of FIG. 1, for example by processor 11 of FIG. 1.

In operation S23, at least one priority level of the at least one retransmitted data unit may be determined, for example by processor 11 of FIG. 1.

In operation S24, any one or more retransmitted data units among the at least one retransmitted data unit whose priority level satisfies the priority condition may be discarded, for example by processor 11 of FIG. 1.

Figure 3A:
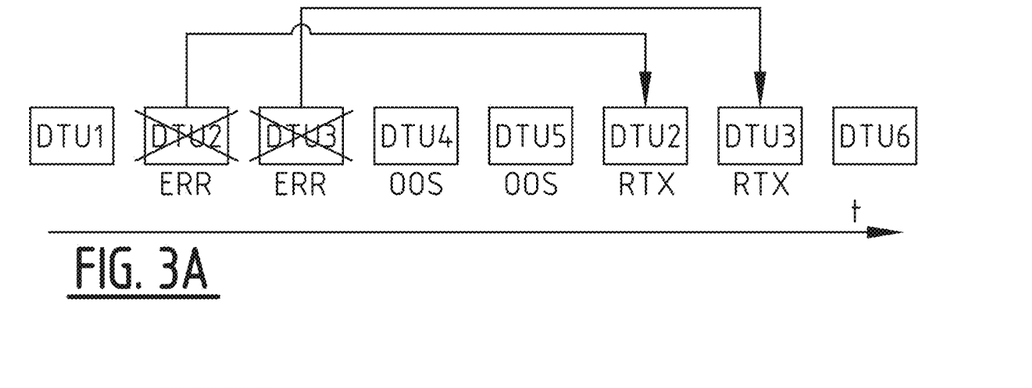
FIGS. 3A and 3B schematically illustrate operation of another embodiment of a method according to the present invention.
Figure 3B:
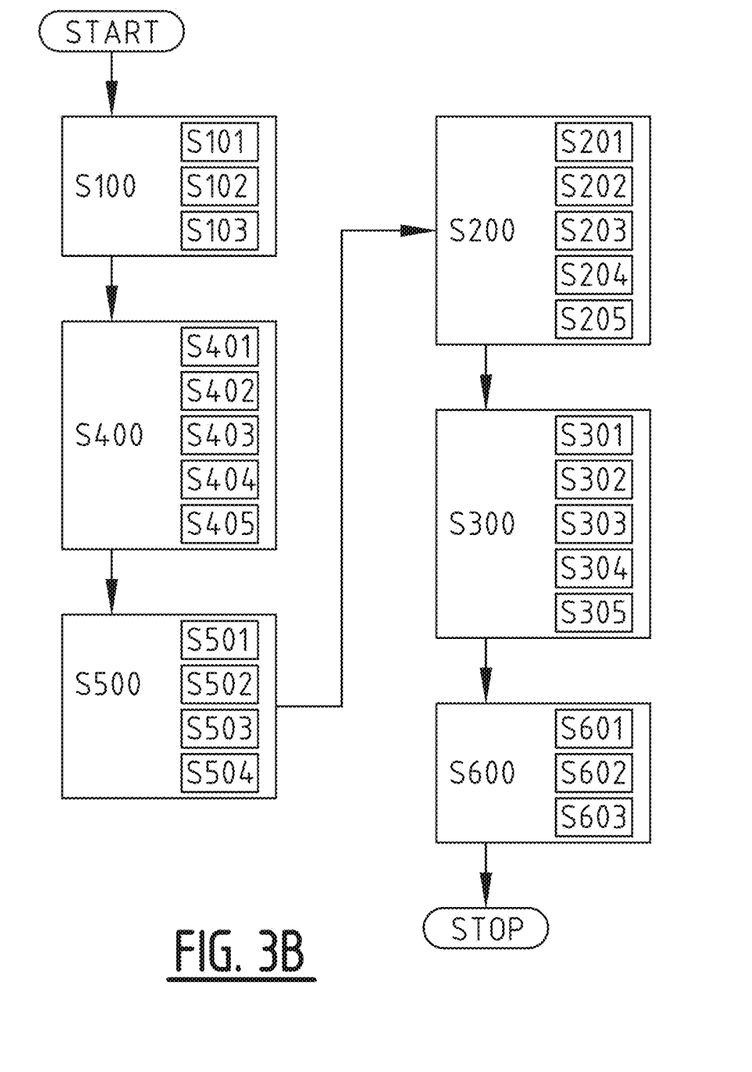

FIGS. 3A and 3B schematically illustrate operation of another embodiment of a method according to the present invention.

FIG. 3A shows a timeline and shows several DTUs, that have a sequential order DTU1, DTU2, DTU3, DTU4, DTU5 and DTU6. These DTUs are transmitted (e.g. by transmitter 20 of FIG. 1) to a receiver (e.g. receiver 10 of FIG. 1). However, in this particular example, DTU2 and DTU3 are lost in transmission (indicated with "ERR" in the figure). Consequently, after DTU1, DTU4 is received, and then DTU5, but DTU4 and DTU5 are out-of-sequence because they do not immediately consecutively follow DTU1 (indicated with "OOS" in the figure), because DTU2 and DTU3 are missing. Retransmission is requested (explicitly, in this particular example) of DTU2 and DTU3, such that DTU2 and DTU3 are retransmitted and received some time later, in this particular example after receiving DTU5. Next, in this particular example DTU6 may be received regularly and in-sequence (because it immediately consecutively follows DTU5).

FIG. 3B illustrates as an example the operation of an embodiment of a method according to the present invention in the context of FIG. 3A. Operation block S100 deals with DTU1, as it arrives in-sequence. Operation block S400 dealing with DTU4 immediately follows operation block S100, since DTU4 arrives subsequently to DTU1 and is thus received out-of-sequence. Likewise, operation block S500 dealing with DTU5 immediately follows operation block S400, since DTU5 is also received out-of-sequence. Operation block S200 follows next, and then operation block S300, dealing with retransmitted DTU2 and retransmitted DTU3 respectively. Finally, operation block S600 is performed, dealing with DTU6 which is received in-sequence.

In operation S101, DTU1 is received in-sequence.

In operation S102, DTU1 is segmented into the data units of DTU1.

In operation S103, the data units of DTU1 are forwarded through the interface. It will be understood that this operation may include joining and/or reassembling separate payloads, in order to generate frames of a form expected by the higher layers of the communication stack.

Consequently, DTU1 is dealt with regularly.

In operation S401, DTU4 is received out-of-sequence.

In operation S402, retransmission is requested of missing DTU2 and missing DTU3. This request may be explicit (e.g. "please retransmit DTU 2 and DTU3") or implicit (e.g. "I have received DTU 4").

In operation S403, DTU4 is segmented into the data units of DTU4.

In operation S404, the priority levels of the data units of DTU4 are determined.

In operation S405, the data units of DTU4 are selectively forwarded through the interface if their priority level satisfies a priority condition or held if not (preferably stored in a receiver retransmission queue).

Consequently, any priority data units of DTU4 may already be delivered to a higher layer even though potential earlier priority data units of DTU2 and DTU3 may not have been received yet. However, it will be understood by the skilled person that this does not endanger the relative order of the priority frames over the several DTUs shown in this example, because DTU4 follows DTU1.

In operation S501, DTU5 is received out-of-sequence. In a first development of this embodiment, it may be decided to not request retransmission again, because in operation S402 such a request has recently been made. In an alternative second development of this embodiment, an additional operation (not shown in the figure) may be performed wherein successful reception of out-of-sequence DTU5 is positively acknowledged, such that the cooperating transmitter may learn from receiver 10 that DTU2 and DTU3 are still missing.

In operation S502, DTU5 is segmented into the data units of DTU.

In operation S503, the priority levels of the data units of DTU5 are determined.

In operation S504, the data units of DTU5 are selectively forwarded through the interface if their priority level satisfies a priority condition or held if not (preferably stored in the receiver retransmission queue).

Consequently, any priority data units of DTU5 may already be delivered to a higher layer even though potential earlier priority data units of DTU2 and DTU3 may still not have been received yet. However, it will again be understood by the skilled person that this does not endanger the relative order of the priority frames, because DTU5 follows DTU4.

In operation S201, DTU2, which was retransmitted, is received, after receiving out-of-sequence DTU4 and DTU5, for example in response to requesting so in operation S402.

In operation S202, DTU2 is segmented into data units.

In operation S203, the priority levels of the data units of DTU2 are determined.

In operation S204, those data units of DTU2 whose priority level satisfies the priority condition are preferably discarded, for example because they may already have incurred too much delay compared to their latency requirements.

In operation S205, remaining data units of DTU2 (after the discarding in operation S204) may be forwarded through the interface.

Consequently, non-priority data units (i.e. those data units whose priority level does not satisfy the priority condition) of DTU2 may now be delivered to a higher layer in their correct order, that is, after those of DTU1 but before those of DTU4 and DTU5 (which are being held, preferably stored in the receiver retransmission queue).

In operation S301, DTU3, which was also retransmitted, is received, after receiving out-of-sequence DTU4 and DTU5, for example in response to requesting so in operation S402.

In operation S302, DTU3 is segmented into the data units of DTU3.

In operation S303, the priority levels of the data units of DTU3 are determined.

In operation S304, those data units of DTU3 whose priority level satisfies the priority condition are preferably discarded, analogously to operation S204.

In operation S305, remaining data units of DTU3 (after the discarding in operation S304) may be forwarded through the interface. Moreover, any data units of DTU4 and DTU5 held in operations S405 and S504 respectively may now also be forwarded through the interface, since their relative order can now be guaranteed, because non-priority data units of DTU1, DTU2 and DTU3 have been successfully forwarded at this time. In case the data units of DTU4 and DTU5 were not stored, but instead DTU4 and DTU5 were stored, further operations on DTU4 and DTU5 may be required to extract the data units to be forwarded.

Consequently, all non-priority traffic up to and including DTU5 has now been handled.

In operation S601, DTU 6 is received in-sequence.

In operation S602, DTU6 is segmented into the data units of DTU6.

In operation S603, the data units of DTU6 are forwarded through the interface.

Consequently, DTU6 is also dealt with regularly.

In this explanation of FIG. 3B, data units are forwarded to the interface, and extracting payloads from the data units is performed on the other side of the interface. It must be understood that alternatively, the extracted payload is reassembled into layer 2 frames prior to forwarding through the interface. One single layer 2 frame may for example comprise payloads from data units originating from multiple DTUs, as explained hereinbelow.

FIG. 4 schematically illustrates the structure of an example DTU that is usable by embodiments according to the present invention. It can be seen from the figure that the DTU contains a header ("DTU HEADER"), a payload ("DTU PAYLOAD") and an error checksum ("ECS"). The payload itself may contain one or (typically) more data units, here k data units. In this particular example, the data units are represented as "DTU frames" however, it will be understood that other types of data units may additionally or alternatively be possible. Each data unit contains a header and a payload. The payloads of the data units may for example be complete or incomplete layer 2 frames, such as Ethernet frames. These layer 2 frames may for example extend over multiple data units of multiple (preferably consecutive) DTUs. In particular in this context, it is an insight of the inventor to determine the integrity of the payloads (i.e. to determine whether or not the payloads are complete), and to discard payloads that are incomplete, if they also satisfy the priority condition, and if their preceding complementary parts have to be retransmitted and will thus not be available for some time.

Therefore, to facilitate embodiments according to the present invention, the data unit headers may preferably indicate whether their payload is complete, and if their payload has absolute or relative priority.

To facilitate embodiments according to the present invention, preferably priority levels may be indicated in or may be derivable from the individual data units. It is further advantageous to also include an indication at the level of the DTU as a whole that there are or are no data units whose priority level satisfies the priority condition, because this allows the receiver to immediately proceed to storing the DTU, preferably in a receiver retransmission queue, without first having to decapsulate each separate data unit in search of its priority level.

In a particularly preferred embodiment, such a priority level may have been inserted into overhead data ("header") of the relevant data unit as an indication by the transmitter, which may e.g. have been independently alerted of the payload's priority status by an interworking function, or which may e.g. have itself inspected a header of a payload to be transmitted in that data unit. This allows the receiver to retrieve the indication of the priority level from those overhead data. Alternatively, a header of a payload of that data unit may be inspected by the receiver (in particular the priority unit) to determine the indication of the priority level.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The program storage devices may be resident program storage devices or may be removable program storage devices, such as smart cards. The embodiments are also intended to cover computers programmed to perform said steps of the above-described methods.

The description and drawings merely illustrate the principles of the present invention. It will thus be appreciated that those skilled in the art will be able to devise various arrangements that, although not explicitly described or shown herein, embody the principles of the present invention and are included within its scope. Furthermore, all examples recited herein are principally intended expressly to be only for pedagogical purposes to aid the reader in understanding the principles of the present invention and the concepts contributed by the inventor(s) to furthering the art, and are to be construed as being without limitation to such specifically recited examples and conditions. Moreover, all statements herein reciting principles, aspects, and embodiments of the present invention, as well as specific examples thereof, are intended to encompass equivalents thereof.

The functions of the various elements shown in the figures, including any functional blocks labelled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the present invention. Similarly, it will be appreciated that any flowcharts, flow diagrams, state transition diagrams, pseudo code, and the like represent various processes which may be substantially represented in computer readable medium and so executed by a computer.

It should be noted that the above-mentioned embodiments illustrate rather than limit the present invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim. The word "a" or "an" preceding an element does not exclude the presence of a plurality of such elements. The present invention can be implemented by means of hardware comprising several distinct elements and by means of a suitably programmed computer. In claims enumerating several means, several of these means can be embodied by one and the same item of hardware. The usage of the words "first", "second", "third", etc. does not indicate any ordering or priority. These words are to be interpreted as names used for convenience.

In the present invention, expressions such as "comprise", "include", "have", "may comprise", "may include", or "may have" indicate existence of corresponding features but do not exclude existence of additional features.

Whilst the principles of the present invention have been set out above in connection with specific embodiments, it is to be understood that this description is merely made by way of example and not as a limitation of the scope of protection which is determined by the appended claims.

The invention claimed is:

1. A method for delivering payloads through an interface, wherein the interface is a gamma interface for various digital subscriber line (xDSL) appliances; the method comprising:
   receiving an out-of-sequence data transfer unit, DTU;
   segmenting the out-of-sequence DTU into data units, each data unit including a header and a payload;
   determining priority levels of the data units; and
   for any particular data unit among the data units, (1) selectively forwarding a payload of the particular data unit to the gamma interface in response to a priority level satisfying a priority condition indicating that the particular data unit belongs to priority traffic; or (2) holding the particular data unit in response to the priority level thereof not satisfying the priority condition.

2. The method of claim 1, comprising:
   after receiving the out-of-sequence DTU, receiving at least one retransmitted DTU;
   segmenting the at least one retransmitted DTU into further data units;
   determining priority levels of the further data units; and
   discarding any one or more data units, among the further data units, in response to the priority level thereof satisfying the priority condition.

3. The method of claim 1, wherein the priority condition relates to a latency requirement of the particular data unit.

4. The method of claim 1, comprising:
   determining at least one payload integrity of at least one data unit from among the data units; and
   in response to the particular data unit having the priority level satisfying the priority condition being an incomplete payload, discarding the particular data unit.

5. The method of claim 1, comprising, prior to the forwarding:
   reassembling payloads of at least one data unit from among the data units into layer 2 frames according to an Open Systems Interconnection model.

6. The method of claim 1, wherein the determining the priority levels comprises:
   retrieving an indication of the priority level from overhead data of the data unit; or
   inspecting a header of a payload of the data unit to determine an indication of the priority level.

7. The method of claim 1, comprising:
   storing the out-of-sequence DTU in a receiver retransmission queue: and
   wherein the holding the particular data unit comprises storing the particular data unit in the receiver retransmission queue.

8. A receiver comprising a processor and a memory, wherein the processor is configured to:
   receive an out-of-sequence data transfer unit, DTU;
   segment the out-of-sequence DTU into data units, each data unit including a header and a payload;
   determine priority levels of the data units; and
   for any particular data unit among the data units,
   (1) selectively forward a payload of the particular data unit to an interface in response to a priority level thereof satisfying a priority condition indicating that the particular data unit belongs to priority traffic or
   (2) hold the particular data unit in response to the priority level thereof not satisfying the priority condition, wherein the interface is a gamma interface for various digital subscriber line (xDSL) appliances.

9. The receiver of claim 8, wherein the processor is further configured to:
   after receiving the out-of-sequence DTU, receive at least one retransmitted DTU;
   segment the at least one retransmitted DTU into further data units;
   determine priority levels of the further data units; and
   discard any one or more data units among the further data units in response to the priority level thereof satisfying the priority condition.

10. The receiver of claim 8, wherein the priority condition relates to a latency requirement of the particular data unit.

11. The receiver of claim 8, wherein the processor is further configured to:
   determine at least one payload integrity of at least one data unit from among the data units; and in response to the particular data unit, having the priority level satisfying the priority condition being an incomplete payload, discard the particular data unit.

12. The receiver of claim 8, wherein the processor is further configured to:
   reassemble payloads of at least one data unit from among the data units into layer 2 frames.

13. The receiver of claim 8, wherein the processor is configured to determine a priority level by:
   retrieving an indication of the priority level from overhead data of the data unit; or
   inspecting a header of a payload of the data unit to determine an indication of the priority level.

14. The receiver of claim 8, wherein the processor is configured to:
   store the out-of-sequence DTU in a receiver retransmission queue.

15. A network apparatus comprising a receiver according to claim 8.

* * * * *